US010800324B2

(12) United States Patent
Takayama et al.

(10) Patent No.: US 10,800,324 B2
(45) Date of Patent: Oct. 13, 2020

(54) AUTO CANCEL MECHANISM FOR TURN SIGNAL SWITCH DEVICE

(71) Applicants: TOYO DENSO CO., LTD., Minato-Ku, Tokyo (JP); HONDA MOTOR CO., LTD., Minato-Ku, Tokyo (JP)

(72) Inventors: Fuminori Takayama, Tsurugashima (JP); Ryohei Kaneda, Tsurugashima (JP); Michitaka Kobayashi, Wako (JP); Yudai Hirohata, Wako (JP); Masahiko Shimada, Wako (JP)

(73) Assignees: Toyo Denso Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/717,088

(22) Filed: Dec. 17, 2019

(65) Prior Publication Data

US 2020/0282900 A1    Sep. 10, 2020

(30) Foreign Application Priority Data

Mar. 7, 2019 (JP) ................................ 2019-041213

(51) Int. Cl.
  *B60Q 1/42*     (2006.01)
  *H01H 21/34*    (2006.01)
  *H01H 21/04*    (2006.01)

(52) U.S. Cl.
  CPC ............. *B60Q 1/425* (2013.01); *H01H 21/04* (2013.01); *H01H 21/34* (2013.01)

(58) Field of Classification Search
  CPC ......... B60Q 1/425; H01H 21/34; H01H 21/04

USPC .......... 200/61.27, 61.3–61.36, 61.54, 61.37, 200/61.38

See application file for complete search history.

(56) References Cited

U.S. PATENT DOCUMENTS

| 5,859,396 A * | 1/1999 | Yokoyama | B60Q 1/1469 200/61.27 |
| 6,025,565 A * | 2/2000 | Miyase | B60Q 1/1476 200/61.28 |
| 6,034,338 A * | 3/2000 | Uchiyama | B60Q 1/1469 200/292 |

(Continued)

FOREIGN PATENT DOCUMENTS

| EP | 3 192 699 B1 | 5/2018 |
| JP | H08-167345 A | 6/1996 |
| JP | 2017-124755 A | 7/2017 |

*Primary Examiner* — Edwin A. Leon
*Assistant Examiner* — Lheiren Mae A Caroc
(74) *Attorney, Agent, or Firm* — Carrier Blackman & Associates, P.C.; Joseph P. Carrier; William D. Blackman

(57) ABSTRACT

In an auto cancel mechanism for a turn signal switch device, a click stop mechanism includes a click feeling-generating body formed from an elastic material and supported on a switch case, and a click pin supported on a switch actuator and resiliently pressed against the click feeling-generating body. Since the click feeling-generating body is formed integrally with an elastic stopper part disposed between a guide pin and a front end of a guide groove, the guide pin collides with the elastic stopper part without colliding with the front end of the guide groove, and noise generated by the collision is reduced. Moreover, since the elastic stopper part is formed integrally by utilizing the click feeling-generating body, it is possible to suppress an increase in the number of components and the number of assembly steps.

3 Claims, 7 Drawing Sheets

(56) References Cited

U.S. PATENT DOCUMENTS

2002/0112947 A1\* 8/2002 Shibata .................... H01H 1/36
200/61.54

\* cited by examiner

AUTO CANCEL MECHANISM FOR TURN SIGNAL SWITCH DEVICE

BACKGROUND OF THE INVENTION

Field of the Invention

The present invention relates to an auto cancel mechanism for a turn signal switch device.

Description of the Related Art

In such an auto cancel mechanism of a turn signal switch device, an arrangement in which noise generated when a cancel member is moved is reduced is known from Japanese Patent Application Laid-open No. H08-167345 or Japanese Patent Application Laid-open No. 2017-124755.

In the arrangement described in Japanese Patent Application Laid-open No. H08-167345, a plate-shaped buffer material 30 is mounted on an inner face of a cover 3 (switch case), and slidably abutting a cam body 21 (cancel member), that moves forward and backward with respect to a steering shaft, against the buffer material 30 reduces noise generated due to direct collision between the cam body 21 and the cover 3, etc.

Furthermore, in the arrangement described in Japanese Patent Application Laid-open No. 2017-124755, leaf spring portions 51d, 52d are formed integrally with a cancel lever 4 (cancel member), and pressing the leaf spring portions 51d, 52d against a lower case 33 (switch case) reduces the noise generated due to direct collision between the cancel lever 4 and the lower case 33.

When the arrangement is such that a guide pin provided on a cancel member is engaged with a guide groove provided in a switch case, and the cancel member is moved forward and backward along the guide groove, there is a possibility that noise will be generated when a switch actuator is operated by means of an operating lever from a neutral position to a left turn position or a right turn position and the cancel member is moved forward toward a steering shaft.

However, as described in Japanese Patent Application Laid-open No. H08-167345 and Japanese Patent Application Laid-open No. 2017-124755, merely disposing an elastic material or a leaf spring part between the cancel member and the switch case cannot sufficiently reduce the noise generated, which is a problem.

SUMMARY OF THE INVENTION

The present invention has been accomplished in light of the above circumstances, and it is an object thereof to reduce the noise generated in an auto cancel mechanism for a turn signal switch device.

In order to achieve the object, according to a first aspect of the present invention, there is provided an auto cancel mechanism for a turn signal switch device, comprising a switch case, a switch actuator that is pivotally supported on the switch case and is swung by operation of an operating lever, a click stop mechanism that makes the switch actuator stop with click feeling at any of a neutral position, a left turn position, and a right turn position, and a cancel member that moves forward and backward while a guide pin is guided by a guide groove formed in the switch case, the cancel member moving forward to a position close to a steering shaft when the switch actuator is at the left turn position or the right turn position and moving backward to a position away from the steering shaft when the switch actuator is at the neutral position, the click stop mechanism having a click feeling-generating body that is formed from an elastic material and is supported on the switch case, and a click pin that is supported on the switch actuator and is resiliently pressed against a clicking surface of the click feeling-generating body, and the click feeling-generating body being integrated with an elastic stopper part disposed between the guide pin and the steering shaft side of the guide groove.

In accordance with the first aspect, when the operating lever is operated and the switch actuator is swung from the neutral position to the left turn position or the right turn position, the switch actuator is stopped with click feeling at the left turn position or the right turn position by the click stop mechanism. At the same time as the above, when the cancel member is moved forward to a position close to the steering shaft by the guide pin being guided by the guide groove formed in the switch case, and the steering shaft is operated in the return direction, the cancel member is moved backward in a direction away from the steering shaft by the guide pin being guided by the guide groove.

The click stop mechanism includes the click feeling-generating body formed from an elastic material and supported on the switch case, and the click pin supported on the switch actuator and resiliently pressed against the click feeling-generating body, and since the click feeling-generating body is formed integrally with the elastic stopper part, which is disposed between the guide pin and the front end of the guide groove, when the cancel member is moved forward to a position close to the steering shaft by the guide pin being guided by the guide groove, the guide pin collides with the elastic stopper part of the click feeling-generating body without colliding with the front end of the guide groove, and noise generated by the collision is reduced. Moreover, since the elastic stopper part is formed integrally by utilizing the existing click feeling-generating body, it is possible to suppress an increase in the number of components and the number of assembly steps.

According to a second aspect of the present invention, in addition to the first aspect, the click feeling-generating body is integrated with an elastic wall part disposed between the cancel member and an inner face of the switch case.

According to a third aspect of the present invention, in addition to the first aspect, with regard to a groove that is formed in the click feeling-generating body and through which the guide pin is inserted, a length of the groove in a direction orthogonal to a direction in which the cancel member moves forward and backward is a same as or larger than a length of the guide groove in a direction orthogonal to a direction in which the cancel member moves forward and backward.

Note that a first guide pin 32a of an embodiment corresponds to the guide pin of the present invention.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention is explained below by reference to FIG. 1 to FIG. 7. In the following description reference numbers corresponding to components of an exemplary embodiment are included only for ease of understanding, but the applicants' claims are not limited to the exemplary embodiment or to specific components of the exemplary embodiment. In this specification, forward with respect to a turn signal switch device 14 is defined as a direction heading from the turn signal switch device 14 side toward a steering shaft 12 side, and backward is defined as a direction opposite thereto.

Figure 1:
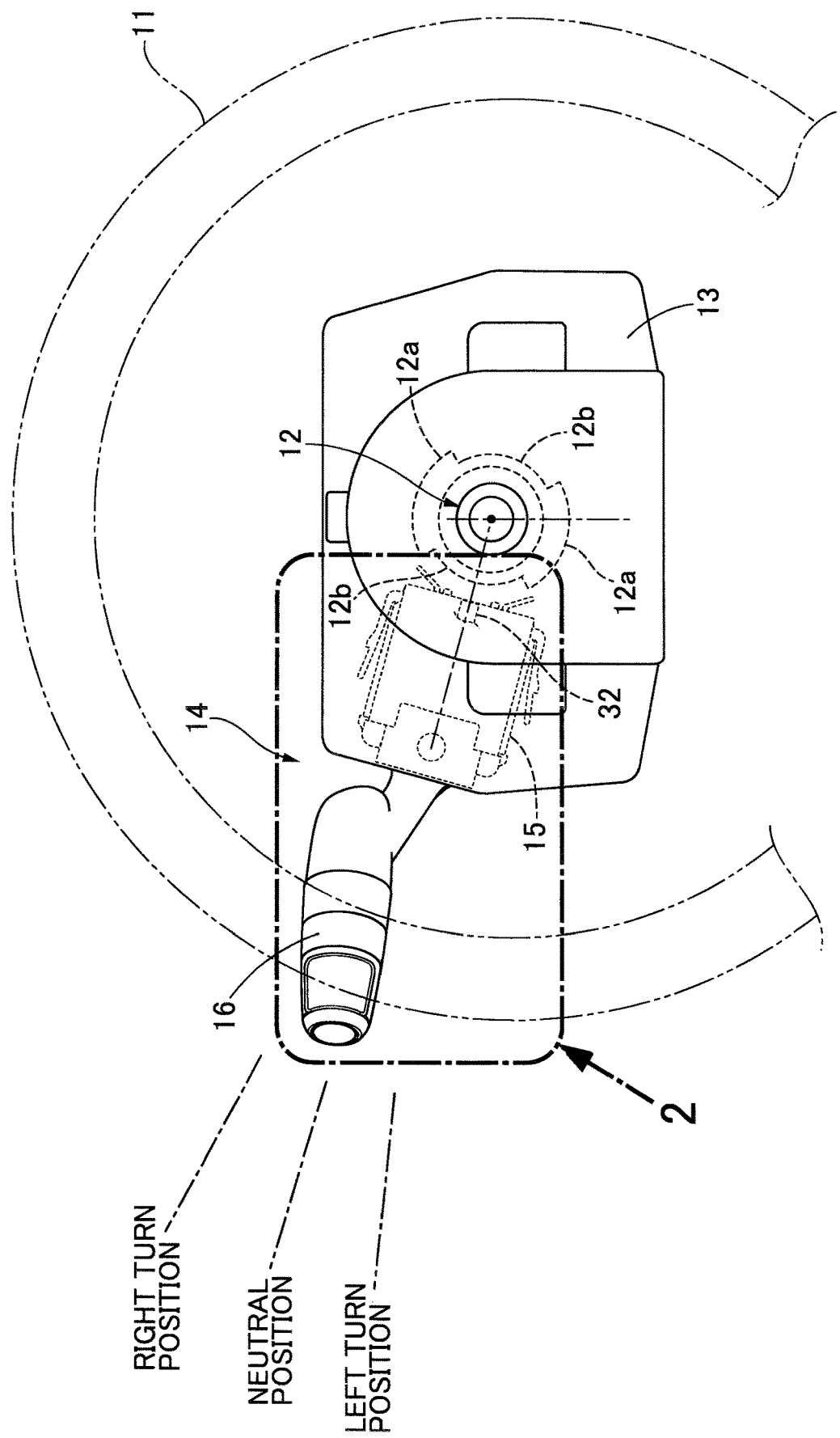
FIG. 1 is a view of a steering wheel of an automobile when viewed from the driver's side.
Figure 2:
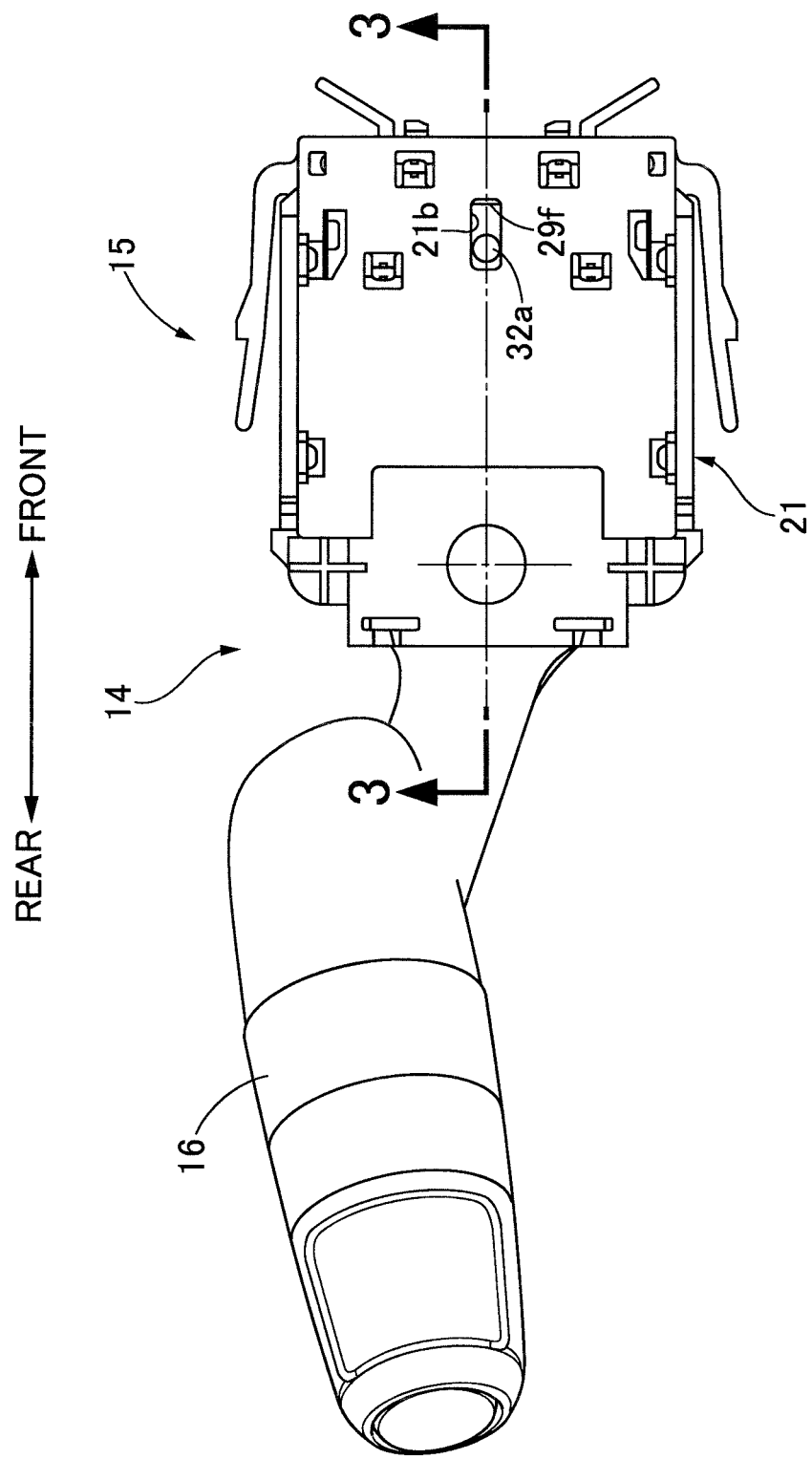
FIG. 2 is an enlarged view of a turn signal switch device of FIG. 1.

As shown in FIG. 1, the turn signal switch device 14, which is for making left and right turn signal lamps flash, is provided on a steering column 13 covering the steering shaft 12, which is connected to a steering wheel 11. The turn signal switch device 14 includes a switch case 15 disposed in the interior of the steering column 13 and an operating lever 16 protruding from the switch case 15 to the exterior of the steering column 13.

The operating lever 16 can selectively stop at a neutral position, a left turn position that is rotated from the neutral position in the counterclockwise direction, and a right turn position that is rotated in the clockwise direction from the neutral position. When the operating lever 16 is at the neutral position the left and right turn signal lamps are off, when the operating lever 16 is at the left turn position the left turn signal lamp flashes, and when the operating lever 16 is at the right turn position the right turn signal lamp flashes. If the steering wheel is rotated in the right turn direction when the operating lever 16 is at the left turn position, the operating lever 16 is automatically returned to the neutral position by an auto cancel mechanism, and if the steering wheel is rotated in the left turn direction when the operating lever 16 is at the right turn position, the operating lever 16 is automatically returned to the neutral position by an auto cancel mechanism.

As shown in FIG. 2 to FIG. 7, the switch case 15 is formed by joining a top cover 21, a center case 22, and a lower cover 23, and a switch actuator 24 housed in the interior of the top cover 21 and the center case 22 can be swung upward (the clockwise direction in FIG. 1) and downward (the counterclockwise direction in FIG. 1) with respect to the switch case 15 by supporting a pair of coaxially disposed shaft portions 24a in a shaft hole 21a of the top cover 21 and a shaft hole 22a of the center case 22 respectively.

A pair of coaxially disposed shaft portions 16a (see FIG. 3) are projectingly provided on the operating lever 16, which is inserted into the interior of the switch actuator 24, and the operating lever 16 can swing with respect to the switch actuator 24 with the shaft portions 16a as a fulcrum. A click pin 26 urged by a spring 25 in a direction in which it protrudes is slidably housed in a guide hole 16b formed in the tip end of the operating lever 16, and the tip end of the click pin 26 selectively abuts against either of two click grooves 24b, 24c formed in an inner face of the switch actuator 24.

When the tip end of the click pin 26 housed in the operating lever 16 is at a position where it abuts against the click groove 24c, a headlight is in a low beam state. When a driver pushes the operating lever 16 toward the front of the vehicle body around the shaft portion 16a, and the tip end of the click pin 26 is at a position where it abuts against the click groove 24b, the headlight is switched to a high beam state, and the operating lever 16 is retained in the high beam state. When the driver pulls the operating lever 16 toward the rear of the vehicle body around the shaft portion 16a, and the tip end of the click pin 26 is at a position where it abuts against an inclined face 24e, the headlight is switched to the high beam state, and when the driver takes their hand off the operating lever 16, the operating lever 16 shifts to the low beam state.

A click pin 28 is slidably housed in a guide hole 24d formed in the tip end of the switch actuator 24, the click pin 28 being urged by means of a spring 27 in a direction in which it protrudes. On the other hand, a click feeling-generating body 29 formed from a resin material having elasticity is fixed to the interior of the top cover 21 and the center case 22, and a click groove 29a (see FIG. 5) is formed in an inner face of the click feeling-generating body 29, the tip end of the click pin 28 abutting against the click groove 29a. The switch actuator 24, which is integrated with the operating lever 16, can swing around the shaft portion 24a, and when the tip end of the click pin 28 abuts against the click groove 29a in the middle, the switch actuator 24 is stably retained at the neutral position. When the tip end of the click pin 28 abuts against an abutment face 29b on the upper side of the click groove 29a, the switch actuator 24 is stably retained at the left turn position, and when the tip end of the click pin 28 abuts against an abutment face 29c on the lower side of the click groove 29a, the switch actuator 24 is stably retained at the right turn position.

Disposed in the interior of the switch case 15 are a terminal board on which a plurality of fixed contacts are laid and a contact piece on which a movable contact is laid, which are not illustrated. Accompanying pivoting of the operating lever 16, the contact piece slides on the terminal board. The fixed contacts are disposed so as to contact the contact piece when the operating lever 16 is retained at the left turn position or the right turn position, and due to the contact piece contacting and separating from the fixed contacts, electrical contact/separation is carried out and the corresponding turn signal lamp operates in an operational mode corresponding to each of the fixed contacts. Each fixed contact is disposed so as to contact the contact piece when the operating lever 16 is positioned in the low beam state or the high beam state, and due to the contact piece contacting and separating from the fixed contacts, electrical contact/separation is carried out and the headlight operates in an operational mode corresponding to each of the fixed contacts. For example, when the switch actuator 24 is retained at the left turn position, the left turn signal lamp flashes, and when the switch actuator 24 is retained at the right turn position, the right turn signal lamp flashes.

An elongated hole-shaped guide groove 21b (see FIG. 2, FIG. 3, FIG. 4, and FIG. 7) extending in the fore-and-aft direction is formed in the top cover 21, and a first guide pin 32a of a cancel member 32 is supported on the guide groove 21b so that it can swing and slide in the fore-and-aft direction. A front projection 32b opposing the steering shaft 12 is formed at the front end of the cancel member 32, and a rear projection 32c is formed at the rear end. An intermediate part of a coil spring 33 is latched with a spring engagement groove 32d formed in an intermediate part in the fore-and-aft direction of the cancel member 32, and opposite end parts of the coil spring 33 are latched with a pair of spring latching portions 21c provided on the top cover 21. The cancel member 32 is therefore always urged by the resilient force of the coil spring 33 in a direction in which it protrudes forward from the switch case 15.

Formed alternatingly on an outer peripheral face of the steering shaft 12 in the peripheral direction are a plurality of projecting portions 12a projecting toward the radially outer side and a plurality of recess portions 12b recessed toward the radially inner side. When the cancel member 32 is at a backward position, the front projection 32b is present further back than the movement locus of the projecting portion 12a of the steering shaft 12, and when the cancel member 32 is at a forward position, the front projection 32b moves further forward than the movement locus of the projecting portion 12a of the steering shaft 12 and protrudes into the recess portion 12b.

The click feeling-generating body 29, which is formed from an elastic material, integrally includes a plate-shaped elastic wall portion 29d (see FIG. 3 and FIG. 7) extending toward the top cover 21 side and sandwiched between the top cover 21 and the cancel member 32. A groove 29e substantially overlapping the guide groove 21b of the top cover 21 is formed in the elastic wall portion 29d of the click feeling-generating body 29, and an elastic stopper portion 29f (see FIG. 3 and FIG. 7) is formed integrally with the front end of the groove 29e. The elastic stopper portion 29f is positioned slightly further back than the front end of the guide groove 21b of the top cover 21.

The length (groove width) of the groove 29e of the click feeling-generating body 29 in a direction that is orthogonal to the direction in which the cancel member 32 moves forward and backward is set so as to be at least the length (groove width) of the guide groove 21b of the top cover 21 in the direction that is orthogonal to the direction in which the cancel member 32 moves forward and backward. Therefore, when the cancel member 32 moves forward and backward, the first guide pin 32a is guided along the guide groove 21b of the top cover 21 without abutting against the groove 29e of the click feeling-generating body 29.

Figure 3:
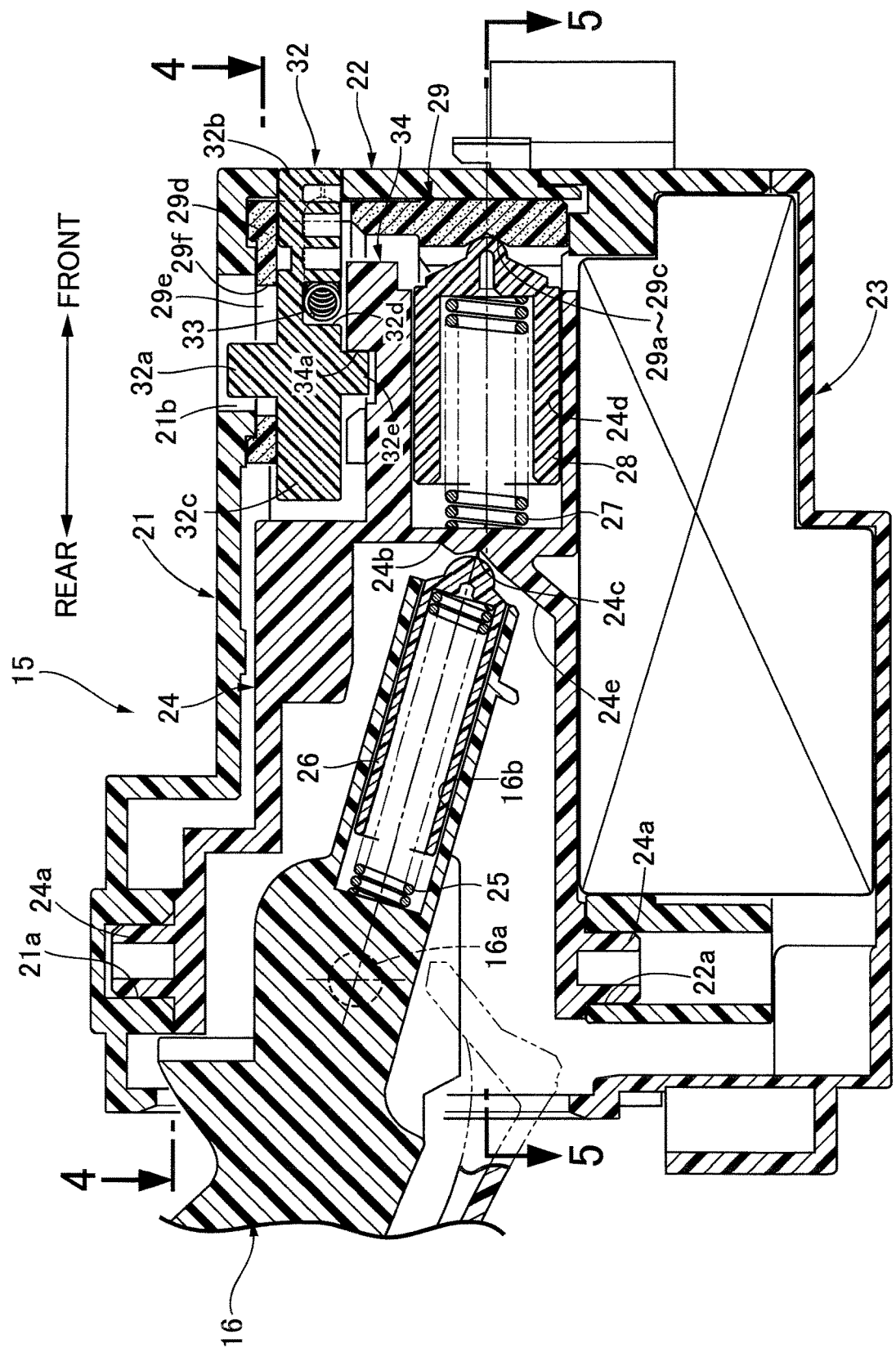
FIG. 3 is an enlarged sectional view along line 3-3 in FIG. 2.
Figure 4:
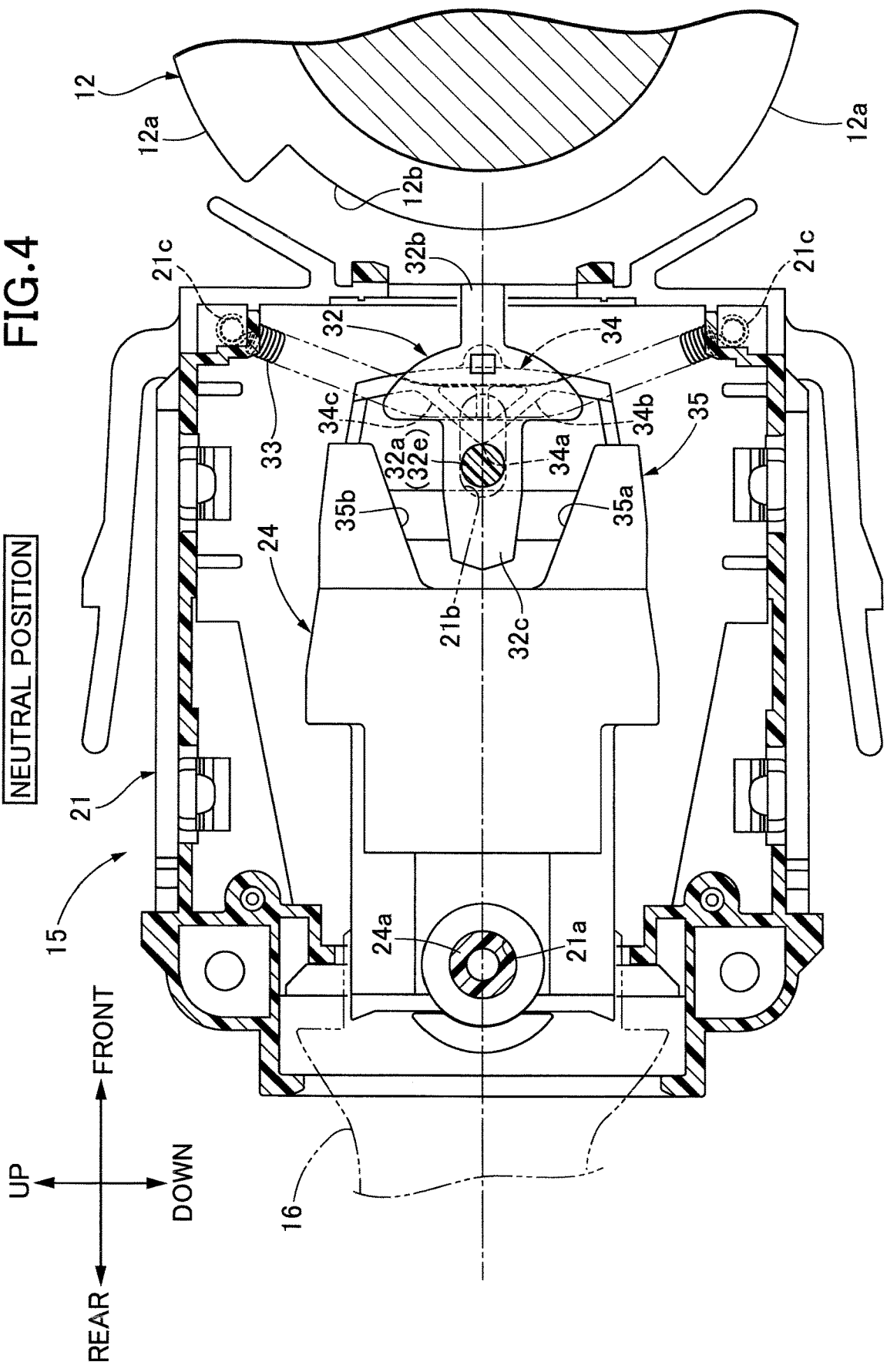
FIG. 4 is a sectional view (neutral position) along line 4-4 in FIG. 3.
Figure 7:
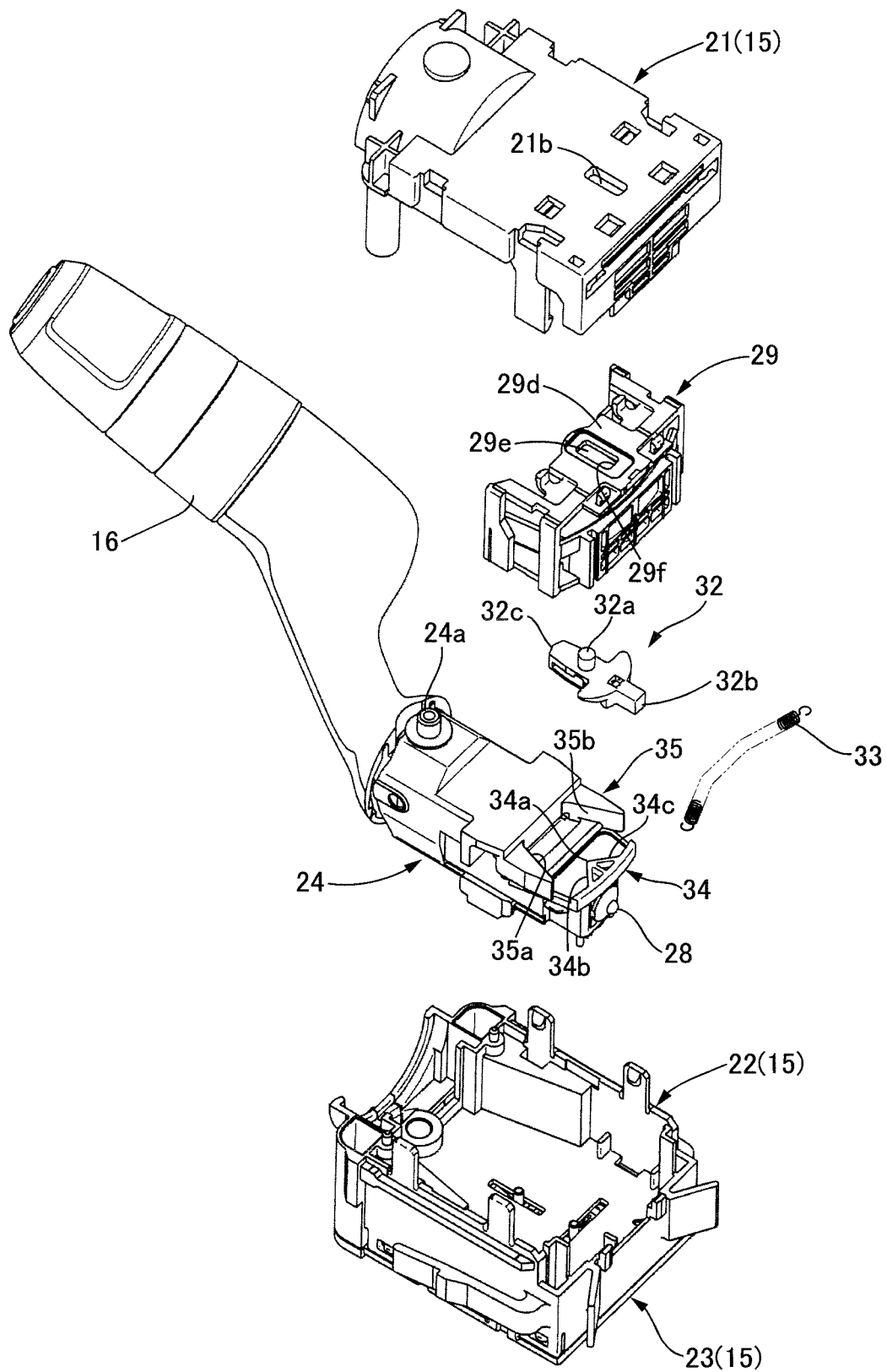
FIG. 7 is an exploded perspective view of the turn signal switch device.

The cancel member 32 includes a second guide pin 32e disposed coaxially with the first guide pin 32a (see FIG. 3, FIG. 4, and FIG. 7). On the other hand, a drive cam part 34 is formed at the front end of the switch actuator 24, the second guide pin 32e being slidably abutted against the drive cam part 34. The drive cam part 34 includes a top face 34a positioned in the center and protruding backward, and a pair of drive cam faces 34b, 34c positioned on opposite sides of the top face 34a and extending obliquely forward.

A follower cam part 35 is formed on a front part of the switch actuator 24, the follower cam part 35 being capable of abutting against the rear projection 32c of the cancel member 32. The follower cam part 35 includes a pair of follower cam faces 35a, 35b positioned on opposite sides of the rear projection 32c and extending obliquely forward.

The operation of the embodiment of the present invention having the above arrangement is now explained.

Figure 5:
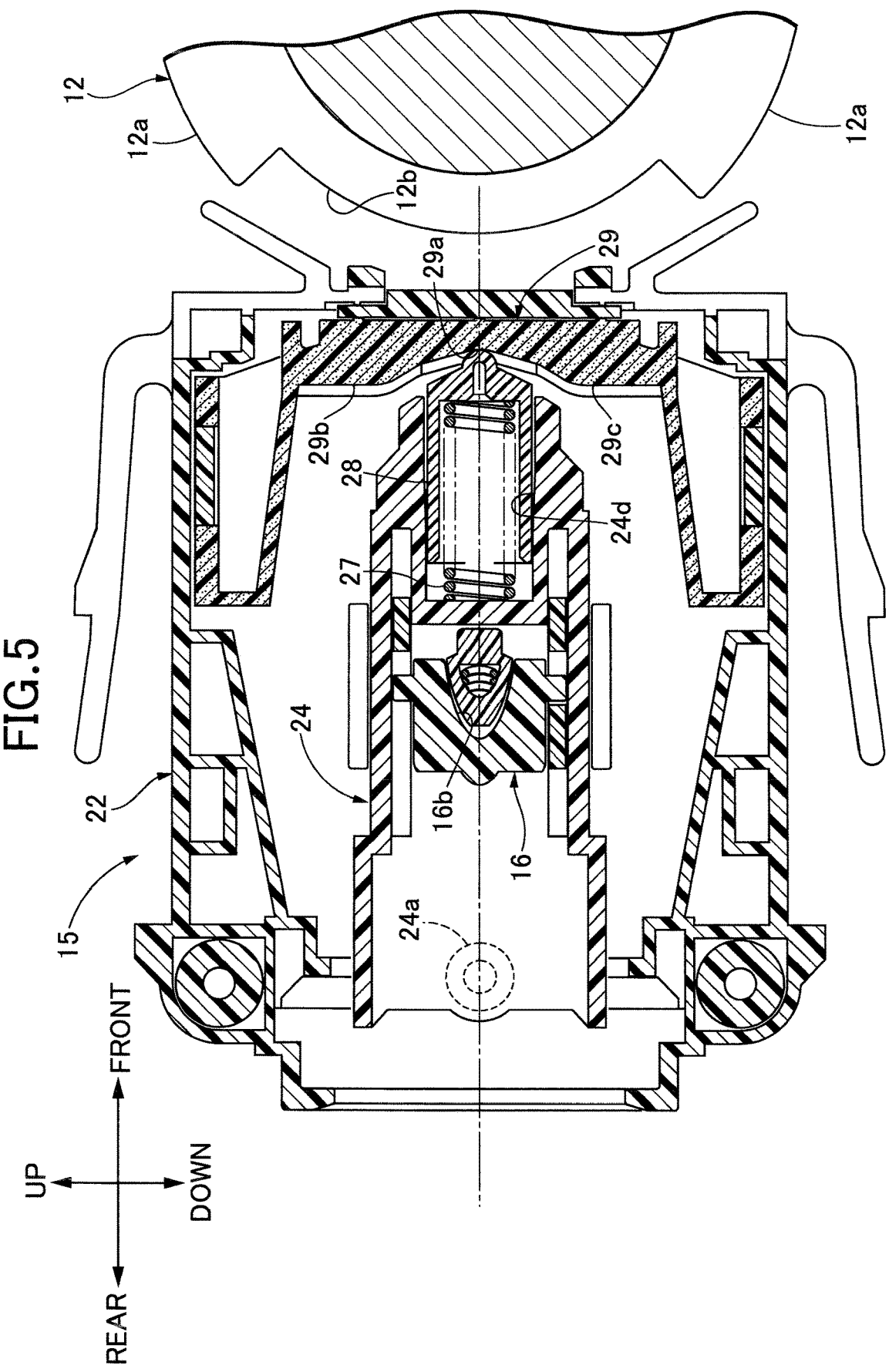
FIG. 5 is a sectional view along line 5-5 in FIG. 3.

When the operating lever 16 is at the neutral position, as shown in FIG. 5 due to the click pin 28 engaging with the click groove 29a in the middle of the click feeling-generating body 29 the switch actuator 24 is stably retained at the neutral position. When the switch actuator 24 is at the neutral position, as shown in FIG. 4 the cancel member 32 urged forward by means of the coil spring 33 is prevented from moving forward due to the second guide pin 32e thereof abutting against the top face 34a of the drive cam part 34, and the front projection 32b of the cancel member 32 is retracted into the interior of the switch case 15.

Figure 6:
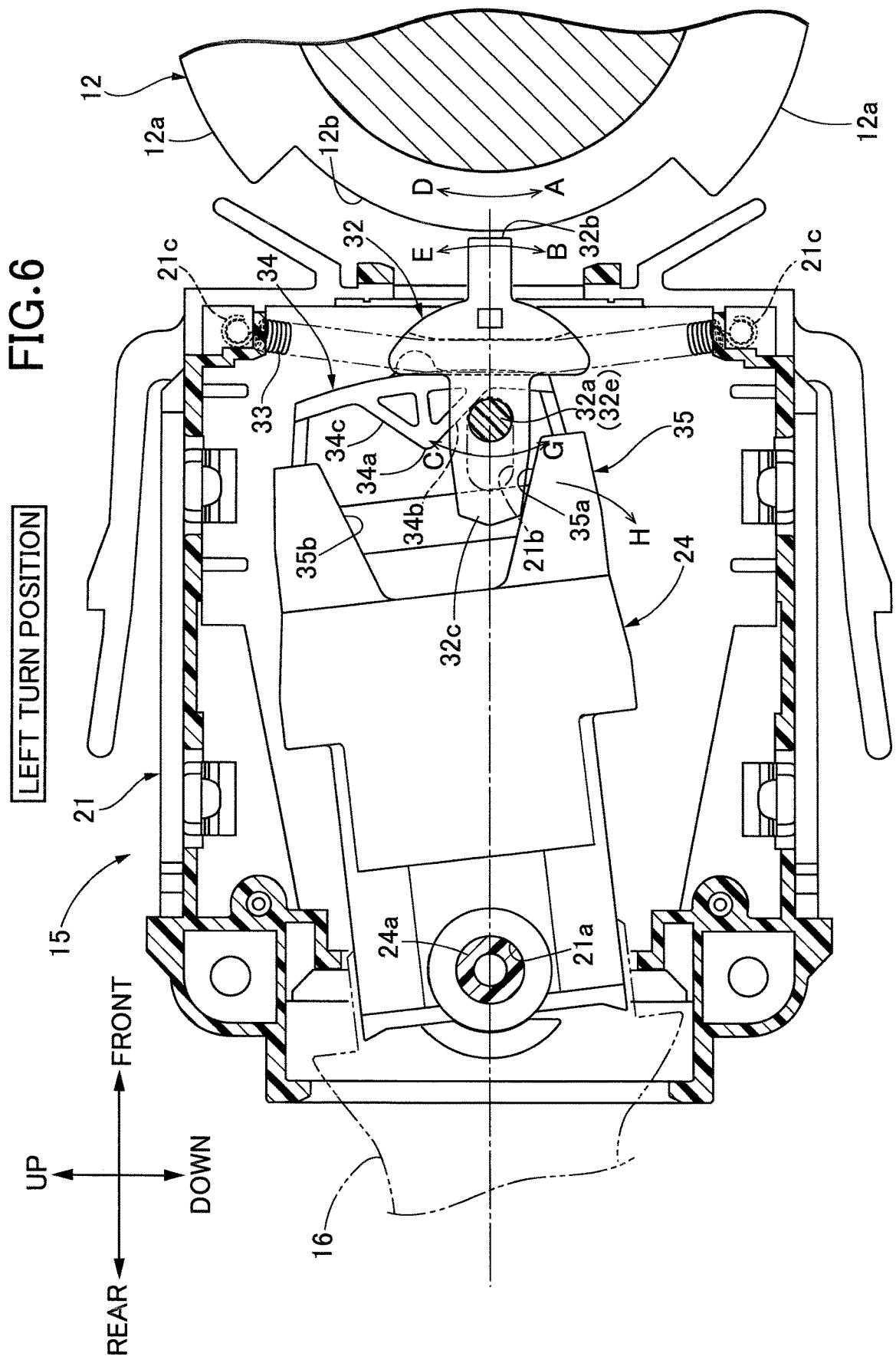
FIG. 6 is a diagram, corresponding to FIG. 4, for explaining the operation (left turn position).

When the driver operates the operating lever 16 in the counterclockwise direction from this state in order to for example turn the vehicle to the left, the switch actuator 24, which is integral with the operating lever 16, swings in the counterclockwise direction with the shaft portion 24a as a fulcrum, and in FIG. 5 due to the click pin 28 coming out from the click groove 29a in the middle of the click feeling-generating body 29 and abutting against the abutment face 29b on the upper side of the click groove 29a the switch actuator 24 is stably retained at the left turn position as shown in FIG. 6. When accompanying swinging of the switch actuator 24 in the counterclockwise direction the drive cam part 34, which is integral with the switch actuator 24, swings in the counterclockwise direction, the second guide pin 32e of the cancel member 32 urged by means of the coil spring 33 is guided by one drive cam face 34b of the drive cam part 34, and the first guide pin 32a is guided by the guide groove 21b of the top cover 21, thereby making the front projection 32b of the cancel member 32 protrude outside the switch case 15 and go inside the locus of rotation of the projecting portion 12a of the steering shaft 12.

Subsequently, when the driver operates the steering wheel 11 in the counterclockwise direction in order to turn left, the steering shaft 12 rotates in a direction shown by arrow A in FIG. 6 and the projecting portion 12a pushes the front projection 32b of the cancel member 32 in a direction shown by arrow B, but the cancel member 32 only swings in vain around the first guide pin 32a and the second guide pin 32e in a direction shown by arrow C, and the rear projection 32c of the cancel member 32 does not abut against the follower cam part 35. As a result, while the driver is operating the steering wheel 11 in the counterclockwise direction, the switch actuator 24 and the operating lever 16 are retained at the left turn position, and the turn signal lamp, which signals that the vehicle is turning left, continues to flash.

When the driver operates the steering wheel 19 in the clockwise direction in order to shift to traveling straight ahead after the left turn is completed, since this time the steering shaft 12 rotates in a direction shown by arrow D in FIG. 6 and the projecting portion 12a pushes the front projection 32b of the cancel member 32 in a direction shown by arrow E, the cancel member 32 swings around the first guide pin 32a and the second guide pin 32e in a direction shown by arrow G, and pushes the follower cam face 35a of the follower cam part 35 in a direction shown by arrow H. As a result, the switch actuator 24 swings in a direction shown by arrow H, and due to the click pin 28 coming out from one abutment face 29b of the click feeling-generating body 29 and engaging with the click groove 29a in the middle, the switch actuator 24 automatically returns to the neutral position and the turn signal lamp signifying a left turn is turned off.

The operation of the auto cancel mechanism at the time of a left turn is explained above, and the operation at the time of a right turn is the same.

When the operating lever 16 is operated from the neutral position to the left turn position or the right turn position, in a conventional turn signal switch device 14 there is a possibility that due to the cancel member 32 moving forward with respect to the switch actuator 24 the first guide pin 32a of the cancel member 32 will slide along the guide groove 21b of the top cover 21, and the first guide pin 32a will collide with the front end of the guide groove 21b, thus generating a noise.

However, in accordance with the present embodiment, since the elastic stopper portion 29f of the click feeling-generating body 29, which is formed from an elastic material, protrudes at the front end of the guide groove 21b (see FIG. 2 and FIG. 3), the first guide pin 32a of the cancel member 32, which is moving forward, will not collide directly with the front end of the guide groove 21b, and due to the first guide pin 32a colliding with the elastic stopper portion 29f of the click feeling-generating body 29 the occurrence of a noise is prevented. Furthermore, since the elastic stopper portion 29f is covered by the switch case 15, it is possible to reduce the collision noise travelling outside the switch case 15.

Moreover, the cancel member 32 slides along the inner face of the top cover 21, and if there is a gap between the cancel member 32 and the inner face of the top cover 21, there is a possibility that when the cancel member 32 slides, the cancel member 32 will be disturbed within the range of the gap and will collide directly with the inner face of the top cover 21, thus generating a noise.

However, in accordance with the present embodiment, since the elastic wall portion 29d of the click feeling-generating body 29, which is formed from an elastic material, is disposed between the cancel member 32 and the top cover 21, it is possible to prevent the cancel member 32 from colliding directly with the top cover 21 to thus generate a noise. Furthermore, since the elastic wall portion 29d is covered by the switch case 15, it is possible to reduce the collision noise travelling outside the switch case 15.

Moreover, when the cancel member 32 moves forward and backward, since the first guide pin 32a of the cancel member 32 is not guided along the groove 29e of the click feeling-generating body 29, which has elasticity, but is guided along the guide groove 21b of the top cover 21, whose stiffness is higher than that of the click feeling-generating body 29, the cancel member 32 can move forward and backward smoothly in a stable attitude without being inclined.

Furthermore, since the elastic stopper portion 29f and the elastic wall portion 29d are formed integrally with the click feeling-generating body 29, compared with a case in which the elastic stopper portion 29f and the elastic wall portion 29d are individually provided it is possible to suppress an increase in the number of components or the number of assembly steps.

An embodiment of the present invention is explained above, but the present invention may be modified in a variety of ways as long as the modifications do not depart from the gist of the present invention.

For example, the operating lever 16 of the embodiment is one that is operated by a left hand, but may be one that is operated by a right hand.

Furthermore, in the embodiment the operating lever 16 is swingably linked to the switch actuator 24 via the shaft portion 16a, but the operating lever 16 and the switch actuator 24 may be integrated.

What is claimed is:

1. An auto cancel mechanism for a turn signal switch device, comprising
    a switch case,
    a switch actuator that is pivotally supported on the switch case and is swung by operation of an operating lever,
    a click stop mechanism that makes the switch actuator stop with click feeling at any of a neutral position, a left turn position, and a right turn position, and
    a cancel member that moves forward and backward while a guide pin is guided by a guide groove formed in the switch case,
    the cancel member moving forward to a position close to a steering shaft when the switch actuator is at the left turn position or the right turn position and moving backward to a position away from the steering shaft when the switch actuator is at the neutral position,
    the click stop mechanism having
        a click feeling-generating body that is formed from an elastic material and is supported on the switch case, and
        a click pin that is supported on the switch actuator and is resiliently pressed against a clicking surface of the click feeling-generating body, and
    the click feeling-generating body being integrated with an elastic stopper part disposed between the guide pin and the steering shaft side of the guide groove.

2. The auto cancel mechanism for a turn signal switch device according to claim 1, wherein the click feeling-generating body is integrated with an elastic wall part disposed between the cancel member and an inner face of the switch case.

3. The auto cancel mechanism for a turn signal switch device according to claim 1, wherein with regard to a groove that is formed in the click feeling-generating body and through which the guide pin is inserted, a length of the groove in a direction orthogonal to a direction in which the cancel member moves forward and backward is a same as or larger than a length of the guide groove in a direction orthogonal to a direction in which the cancel member moves forward and backward.

* * * * *